May 16, 1944.  W. H. KOPITKE  2,349,177
METHOD OF AND APPARATUS FOR MAKING BLOWN PLASTIC ARTICLES
Filed May 9, 1941  3 Sheets-Sheet 1
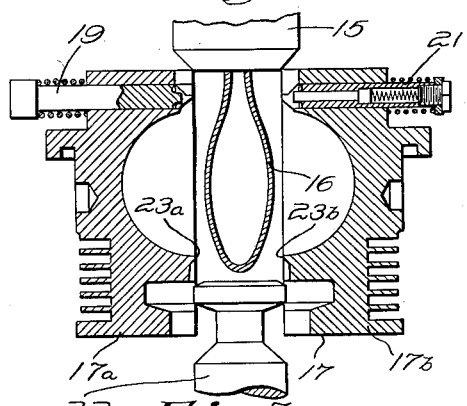
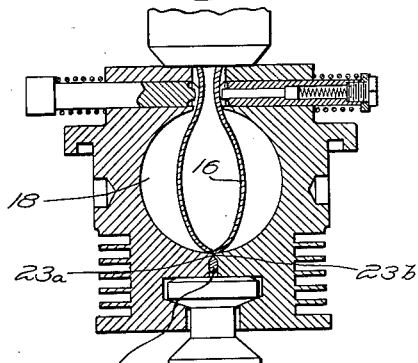
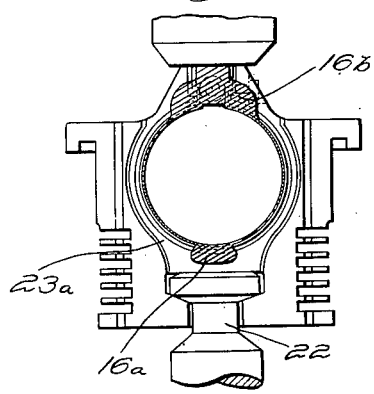
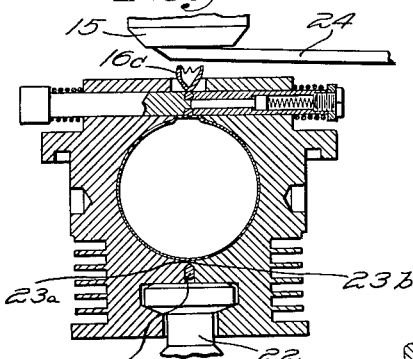
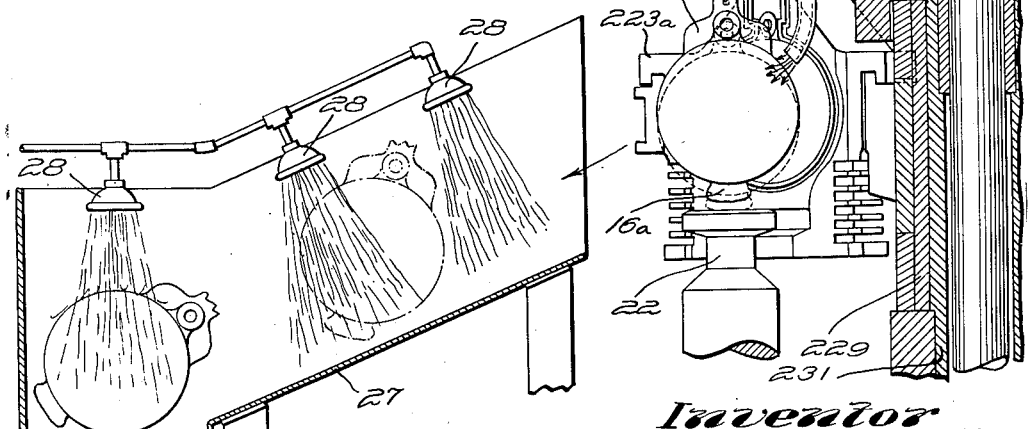
Inventor
William H. Kopitke
by Brown & Parham
Attorneys
Witness
W. B. Thayer

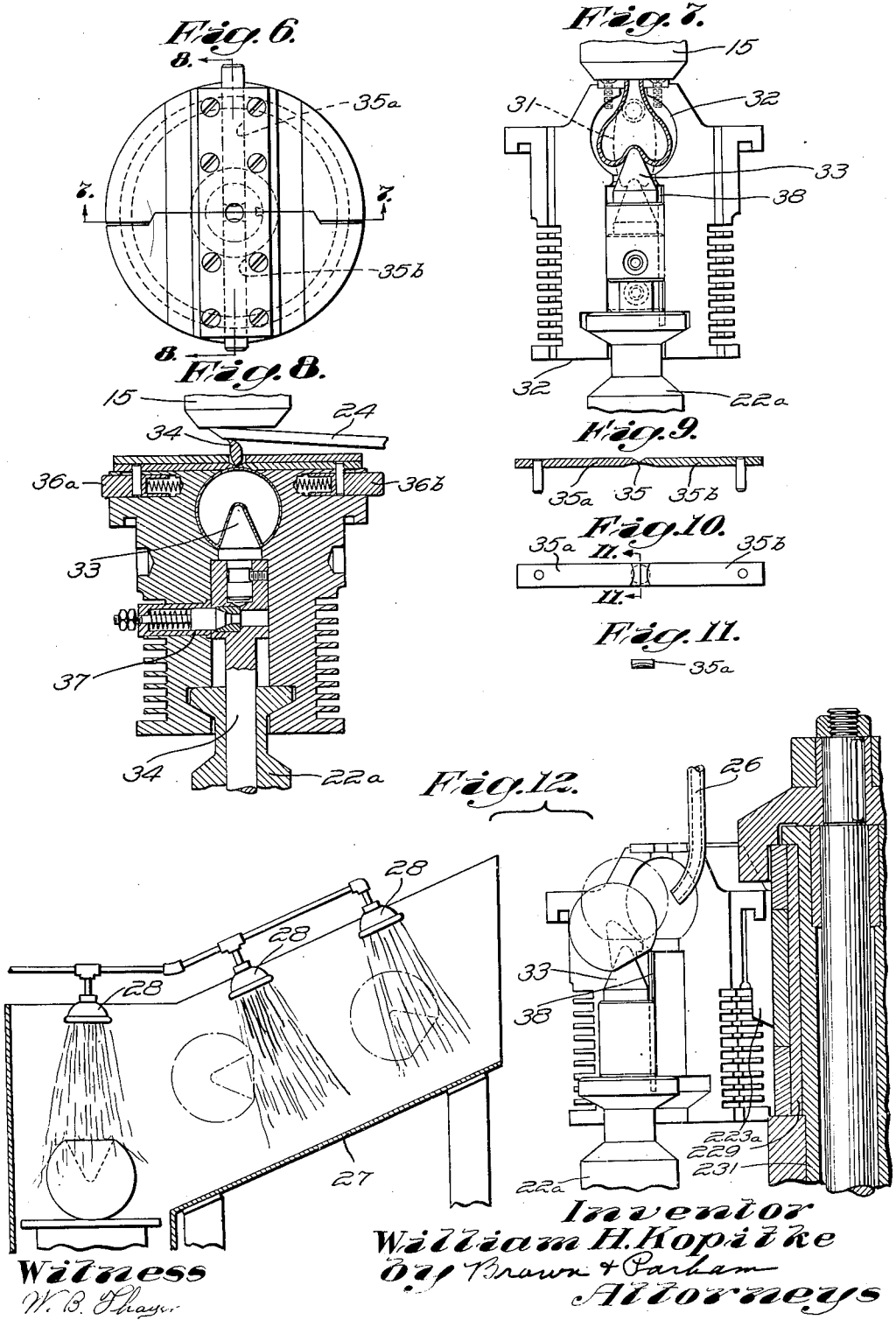

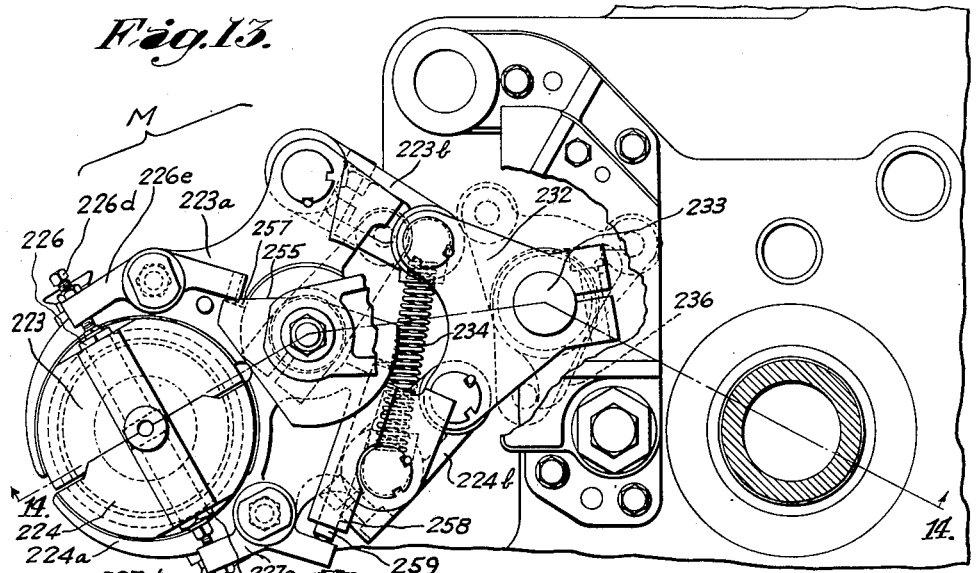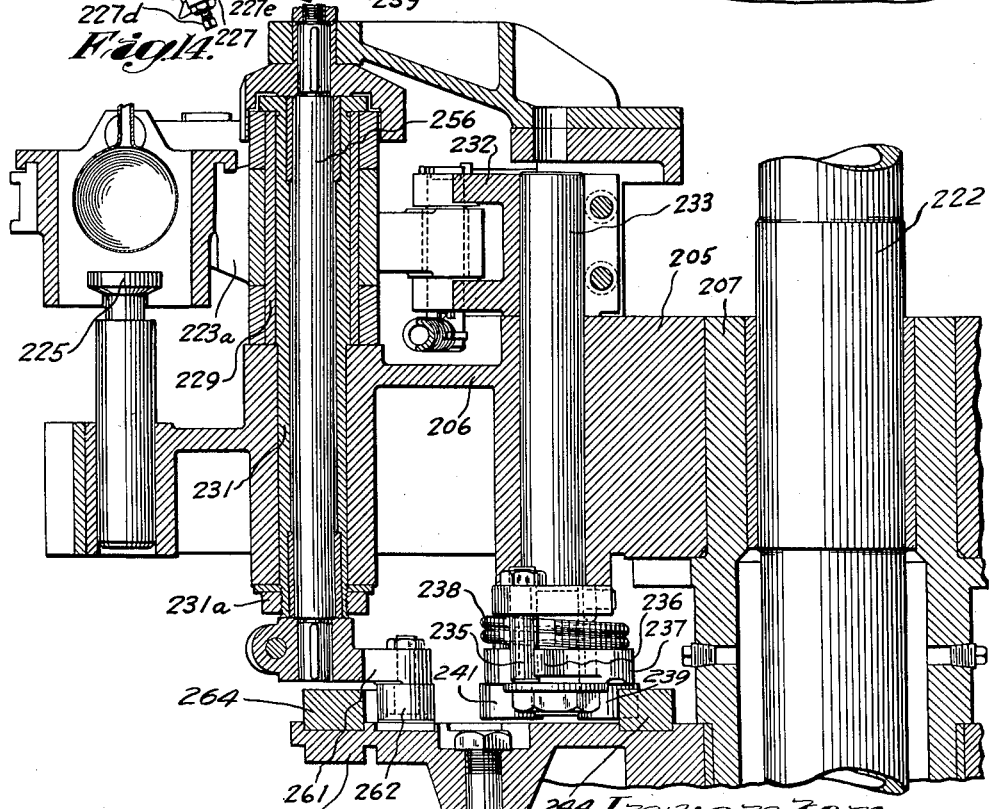

Patented May 16, 1944

2,349,177

UNITED STATES PATENT OFFICE 2,349,177

METHOD OF AND APPARATUS FOR MAKING BLOWN PLASTIC ARTICLES

William H. Kopitke, West Hartford, Conn., assignor to Plax Corporation, Hartford, Conn., a corporation of Delaware Application May 9, 1941, Serial No. 392,660

6 Claims. (Cl. 18—5)

This invention relates to the manufacture of blown plastic articles and the present application is a continuation in part of my prior application Serial No. 378,551, filed February 12, 1941.

The general object of the invention is to provide an improved method and improved apparatus for producing blown plastic articles by first closing the end of a tube of plastic, forming therefrom a bubble of plastic material in a condition to be blown and then blowing the bubble in a mold of the desired shape. Articles made in this way are apt to have welds or scars thereon caused by the tube closing operation or by the severing of the preceding article or bubble from the tubular material. Also the material is apt to be undesirably thick at the bottom or at the top of the article. The purpose of this invention is to eliminate such defects.

More particularly, it is an object of the invention to improve the appearance of extruded and blown plastic articles and the distribution of plastic in the articles by pinching or cutting off part or parts of the plastic bubble between the joints of the mold in which the article is to be blown, in order to eliminate the weld, scar or unduly thick portions of the bubble. This is accomplished by developing the bubble in such a way that it extends beyond the confines of the mold cavity so that parts to be removed are pinched by the mold, which may have special pinching or cutting edges for this purpose.

Another object is to provide a novel method and novel apparatus for forming blown and hermetically sealed articles of plastic material which may be filled with air or other gaseous medium during formation to insure that the articles will retain their shape.

A further object is to form blown hollow plastic articles having indentations therein.

Other objects and advantages of the invention will be pointed out in the following detailed description or will be apparent from such description or from the accompanying drawings in which:

Figures 1 to 5 inclusive depict molds and associated parts of the invention in various stages of operation in performing the novel method;

Figs. 6 to 12 inclusive show apparatus in various stages of operation in carrying out another form of the method;

Fig. 13 is a view in top plan of a blow mold and associated mechanism, parts being broken away for clarity of illustration; and Fig. 14 is a view in vertical section taken approximately on the line 14—14 of Fig. 13.

Pursuant to the invention, suitable plastic material, of which cellulose acetate molding compound is an example, may be formed into a bubble by forming a tube, closing its end and extruding it through an extrusion device, indicated at 15. The bubble may be extruded and expanded as disclosed in my copending application Serial No. 378,551, filed Feb. 12, 1941, or as disclosed in U. S. Patent No. 2,175,054, granted Oct. 3, 1939 to Enoch T. Ferngren and myself.

The plastic bubble is shown at 16 in Fig. 1 just prior to the time when it is enclosed by a mold, indicated generally at 17, having a spherical cavity 18 for the formation of Christmas tree balls. At this point, the bubble will be in a very soft plastic condition of low viscosity.

The mold 17 is of the sectional type, comprising the sections 17a and 17b. At their upper ends the sections have mounted therein pinching plungers 19 and 21, the ends of which are shaped to form an eye on the spherical Christmas tree ornaments and to seal the tubular connection as explained below.

A centering pin 22 is mounted in position to be enclosed by the mold sections.

The manner in which the molds are mounted and the molds and pinchers operated will be described hereinafter.

I have discovered that by pinching the plastic bubble while it is quite soft and workable between the mold sections, as the mold is closed, defective portions may be eliminated and a better appearance and a much more uniform distribution of plastic obtained in the blown final article. In order to do this, the mold sections may be provided with blunt cutting or pinching edges, as shown at 23a and 23b, which for convenience are made to extend around the entire periphery of the mold cavity, as shown in Fig. 3, although the plastic bubble may be pinched only at its upper and lower ends. The plastic bubble is then developed so that it will be caught between these edges when the mold is closed about it, as shown by Fig. 1 where the bottom of the bubble is below the edges at this point. The upper portion of the bubble is similarly developed but this is not apparent from the drawings.

Thus, as shown in Fig. 2, when the mold 17 is closed the lower end portion 16a of the bubble is pinched between the mold sections, and as shown at 16b in Fig. 3 the upper portion is similarly pinched. The mold is closed with sufficient force to squeeze the material caught between the edges 23a, 23b, to a very thin fin which is finally removed by a finishing operation, together with the material at 16a and 16b. As the result of this operation, the bubble is pinched together in clean welds just inside the cutting edges where the bubble is caught between them.

After the mold is closed, air is admitted into the bubble 16, which is expanded in contact with the spherical cavity 18 to form the ball shown in Figs. 3, 4 and 5.

After the article has been blown and before the air pressure is cut off, the pinching devices 19 and 21 are forced together, as shown in Fig. 4, to form an eye on the ball, which eye is shown in Figs. 4 and 5, and to close the tubular connection at 16c, Fig. 4, entrapping air under pressure within the ball. Connection 16c is severed from the material in the nozzle 15 by a knife 24. The balls are filled with air to keep them distended.

It is preferred to discharge the article from the mold before it has been rigidified by cooling within the mold, although if desired the article may be cooled within the mold. Such premature discharge of the ball from the molds permits a greater mold use and a higher rate of production. However, if the articles are not rigidified when discharged from the molds, the entrapped gaseous medium will swell or bloat the articles and may burst them. To prevent this, the articles are discharged into a cooling bath at the instant that the mold opens. The pinching of the lower and upper parts of the bubble eliminates relatively thick material which if allowed to remain would tend to cause bloating because of its greater retention of heat than other parts of the ball.

As shown in Fig. 5, the knockout device 25 engages the upper end of the ball to dislodge the ball from the mold as the mold opens. The ball is dislodged suddenly and strikes the centering pin 22, as shown by its dotted line position, and bounces upwardly into the position in which it is shown in Fig. 5. A blast of air is admitted through a pipe 26 which catches the ball on the rebound and shoots it into a trough 27 in which the ball is sprayed with water from one or more nozzles 28. In this way, balls are chilled and set quickly enough to prevent them from becoming bloated or bursting, due to the air pressure therein.

When the balls have cooled, they are finished by removal of fins or other excess material not completely removed therefrom in the forming operations, such as those left by the mold pinching and eye forming operations.

In the form of the invention shown in Figs. 6 to 12 inclusive, a substantially spherical article is formed having a conical indentation. This article is made into a salt cellar by drilling a hole in the tip of the indentation. As shown in Fig. 7, a bubble of soft blowable plastic is first formed at 31 through nozzle 15 as before and the sectional mold 32 is closed around it. The bubble is then blown to the shape of the mold cavity 32 and the conical indentation formed therein by plunger 33. Plastic connection 34 is severed completely from the article by blades 35a and 35b of a cutter slidably mounted in the mold sections, as shown in Figs. 6 and 8, and connected by pins to plungers 36a and 36b, which are operated in the same way as the pinching plungers of Figs. 1 to 4. The cutter, being operated before the air is cut off, serves to entrap air under pressure in the article as well as to remove the connection 34 which also is cut off from the plastic in the nozzle 15 by the knife 24. The adjoining ends of the cutter are spherically recessed underneath at 35 to form into spherical shape the top portion of the article.

The order in which the steps are performed in making the article shown in Figs. 8 and 12 may be varied. For example, low pressure air may first be admitted into the bubble and then higher air pressure admitted while at the same time the plunger 33 is raised. The cutter is then operated. But the preferred order of steps is first to admit the low pressure air and then the high pressure air and then to pinch or sever the connection 34, the elevation of the plunger 33 being left as the last operation to be performed. This tends to leave a smoother and more uniform condition in the plastic where it is cut off by the members 35a and 35b than is the case when the plunger is operated before the plastic is pinched.

The plunger 33 is mounted on a rod 34 which passes upwardly through the centering pin 22a and which is held in uppermost position by a detent shown at 37. The plunger may be raised by suitable mechanism, not shown, and the detent may be withdrawn and the plunger lowered by other suitable means, also not shown. The detent permits the mold to be carried from a position where the plunger raising mechanism is located to other positions, while the plunger 33 is retained in operative position, as shown in Fig. 8.

The article may be additionally cooled outside of the mold by being discharged into the trough 27 and subjected to sprays from the nozzles 28, as shown in Fig. 12. The article in this case is discharged by the lowering of the plunger 33 which causes the article to be cocked at an angle by a pin 38 whereupon a blast of air from the air tube 26 shoots the article into the trough 27.

The molds and associated parts, shown in Figs. 1 to 12 inclusive, may be supported and operated in any suitable manner. For example, a number of molds may be mounted on a rotary carrier or table and moved thereby into and out of position beneath the nozzle 15 in the manner shown in my copending application Serial No. 378,551, filed Feb. 12, 1941, and may be opened and closed and the pinching devices operated by mechanisms shown in my said application. To illustrate this, I have reproduced Figs. 13 and 14 herein from my said application, in which the parts shown in said figures are described substantially as follows, it being understood that the mold M referred to below may be replaced by either the mold 17 of Figs. 1 to 5 or the mold 32 of Figs. 6 to 8, as illustrated in Figs. 5 and 12 respectively, and that the pinching plungers may be replaced by those at 19 and 21 of Fig. 1, or by the cutters 35a, 35b of Figs. 6 to 16.

The sections 223—224 of the mold M are mounted in holders 223a and 224a, Figs. 13 and 14, which holders are pivoted on the bushing 229, Fig. 14, which in turn is mounted on the sleeve-like hinge pin 231 fitting into an appropriate opening in a projection or arm 206, Fig. 14, of the spider 205 and held therein by a nut 231a in its bottom end. The spider 205 constitutes the rotary table or support for a number of molds, only one of which is shown, and is mounted on the upper end of a hub 207 which turns on the column 222 of the table.

The mold is opened and closed through mechanism which comprises links 223b and 224b, Figs. 13 and 14, connected to bell crank 232 fast on the upper end of vertical rock shaft 233 journaled in the spider 205. Oscillation of rock shaft 233 serves to open and close the mold and if desired the mold may be yieldingly held in open and closed position by means of a dead center spring 234 connected to the inner pivot point of link 223b at one end and to the outer pivot point of the link 224b at the other end, as shown in Fig. 13.

At its bottom end the rock shaft 233 carries a pin 235, Fig. 14, which is engaged by lug 236 of a crank 237 on rock shaft 233 when the crank is turned in a direction to open the mold. When the crank 237 is turned in a direction to close the mold, a yielding connection between the crank and the rock shaft is afforded by a coil spring 238 on shaft 233 and connected at one end to the crank 237 and at the other end to the rock shaft 233. Thus if material accidently gets between the sections of the mold, injury to the mold or its operating parts is prevented by the yielding connection thus provided.

The mechanism for actuating the mold opening and closing parts so far described includes, in addition to the crank 237, the cam plate 221 and other parts which will now be described. The crank 237 has an inner roller 239 and an outer roller 241. On the plate 221 is a cam 244 located in position to engage and force the roller 239 outwardly after the mold unit with which it is associated arrives beneath the extrusion head 15 and the cam plate 221 is turned clockwise. This rocks the shaft 233 in a direction to close the mold. When the mold unit is at a delivery position, the outer cam roller 241 is engaged by another cam (not shown) on the cam plate 221 to rock the shaft 233 in the opposite direction and open the mold, this engagement also resulting from clockwise rotation of cam plate 221.

Clockwise rotation of cam plate 221 also operates the pinching devices as explained hereinafter.

Cam plate 221 is oscillated by suitable means, not shown herein but which are disclosed in my copending application, Serial No. 378,551, filed Feb. 12, 1941.

Considering now the mechanism for operating the pinching plungers 226 and 227 and still referring to Figs. 13 and 14, it will be seen that the outer ends of the plungers 226 and 227 are engaged by the adjustable contact screws 226d and 227d in the ends of levers 226e and 227e pivoted on the respective mold arms 223a and 224a, as clearly shown in Fig. 13. These arms are oscillated by a rotary member 255 mounted on the upper end of a vertical rock shaft 256, Fig. 14, within the hinge pin sleeve 231 of the mold arm. The member 255 has an outwardly projecting lug 257, Fig. 13, which engages the inner end of the arm 226 and it also has a diametrically located horizontal sleeve 258 which contains a pin 259 engaging the inner end portion of the lever 227e. Thus, when the rock shaft 256 and the member 255 are turned in a clockwise direction, levers 226e and 227e bring pressure upon the outer end portions of the pinching plungers 226 and 227, forcing them inwardly of the mold to pinch the hollow stem or connection and seal the pressure fluid within the hollow article in the mold. When the operation is reversed, the plungers 226 and 227 are permitted to be forced outwardly by their respective compression springs.

The rocking movements referred to are brought about by crank 261, Figs. 13 and 14, clamped on the bottom end of the rock shaft 256 and carrying a roller 262 engaged by cams on the cam plate 221, one of which is shown at 264. The cam 264 moves the pinching plungers into pinching position just before the associated mold moves out of cooperative relation to the extruder head 15, this action resulting from the oscillation of the cam plate 221 in a clockwise direction beyond the position into which it previously was moved to close the mold. The pinching plungers are permitted to move outwardly into release position at a delivery station as a result of the roller 262 being forced outwardly by another cam, not shown.

From the above, it is apparent that the mold 17 of Figs. 1 to 5 and the pinching plungers 19 and 21 may be supported and operated in the same way as the mold M and the pinching plungers 226 and 227, and that the mold 32 and associated cutters 35a, 35b may be supported and operated in the same way.

Having thus described my invention, what I claim is:

1. The process of forming hollow articles of organic plastic material which comprises expanding organic plastic material into contact with the walls of a mold by the admission of gaseous pressure medium into said material through a portion thereof, sealing the portion of said material where the fluid pressure medium enters to entrap some of the gaseous pressure medium under pressure within the article, discharging the article from the mold before it has rigidified sufficiently to prevent expansion of the article by said medium, and immediately subjecting the article to a cooling fluid to rigidify the plastic material sufficiently to prevent the entrapped gaseous medium from expanding and distorting the article.

2. The process of forming hollow articles of organic plastic material which comprises forming a bubble of such material in suspension from an extrusion nozzle, the bubble being suspended from the nozzle by connecting tubular plastic material, closing a sectional mold about the suspended bubble, admitting gaseous pressure medium into the bubble through said tubular connection to expand it to the shape of the said mold, and while maintaining the application of such pressure medium sealing the said tubular connection to entrap said medium under pressure within the blown article and simultaneously severing the tubular connection from the said article in a plane substantially below the bottom of said nozzle thereby leaving material of said connection on said nozzle, and independently severing said material left on the nozzle from material within the nozzle.

3. In the process of forming hollow articles from organic plastic material which involves blowing such material in a sectional mold, the steps comprising severing material from and closing the end of plastic material in tubular form, extruding and expanding the closed tubular material to develop a bubble, the bottom portion of which projects beyond the cavity of the mold, closing the mold about the bubble and pinching in the joint thereof the said bottom part of the bubble whereby said part may be removed to eliminate a defect in the final article resulting from the said closing and severing operation, and blowing the bubble into the shape of the mold cavity.

4. Apparatus for forming hollow articles from organic plastic materials comprising an extrusion nozzle through which tubular material is extruded and a bubble of plastic is developed therefrom while connected to said tubular material, a sectional mold having a cavity therein for blowing said bubble into the desired article, means for closing said mold about the bubble, means associated with the mold for sealing the connected tubular material between the said nozzle and the material in the mold, said means comprising devices for forming an eye on the article and means for operating the last named means to effect said sealing and eye-forming operations.

5. Apparatus for forming hollow articles from organic plastic materials comprising a mold wherein a bubble of plastic material connected to tubular material is expanded by a fluid pressure medium, means for opening and closing said mold, means for sealing the tubular material connected to said bubble to entrap gaseous pressure medium in an article formed in said mold by the admission of the medium into said bubble, means for opening the mold before the article has rigidified sufficiently to prevent bloating thereof by the pressure medium, a liquid cooling spray, and means for shooting the article into the cooling spray upon the opening of the mold to rigidify the article sufficiently to prevent bloating thereof.

6. The process of forming hollow articles from organic plastic material by blowing such material in a sectional mold which comprises, forming said material into an end-closed tube, developing and suspending said end-closed tube in the form of a bubble and elongating the bubble so that an exterior portion of the bottom thereof projects beyond the cavity of the mold when the mold is closed about the bubble, closing the mold about the bubble and pinching in the joint thereof the exteriorily projecting bottom portion of the bubble and welding together the material of the bubble just inside the mold joint where said bottom portion of the bubble is pinched, and blowing the bubble into the shape of the mold cavity.

WILLIAM H. KOPITKE.